(12) United States Patent
Abadilla et al.

(10) Patent No.: US 8,702,169 B2
(45) Date of Patent: Apr. 22, 2014

(54) METHOD AND APPARATUS FOR AN INFANT SAFETY SEAT

(75) Inventors: Arvin Grande Abadilla, Sugar Land, TX (US); Albert Grande Abadilla, Sugar Land, TX (US)

(73) Assignee: Arvin Grande Abadilla, Sugar Land, TX (US)

( * ) Notice: Subject to any disclaimer, the term of this patent is extended or adjusted under 35 U.S.C. 154(b) by 350 days.

(21) Appl. No.: 13/033,714

(22) Filed: Feb. 24, 2011

(65) Prior Publication Data

US 2011/0298257 A1 Dec. 8, 2011

Related U.S. Application Data

(60) Provisional application No. 61/351,502, filed on Jun. 4, 2010, provisional application No. 61/366,796, filed on Jul. 22, 2010.

(51) Int. Cl.
*A47D 1/10* (2006.01)

(52) U.S. Cl.
USPC .............................. 297/256.12; 297/256.16

(58) Field of Classification Search
USPC ....................... 297/256.12, 256.16
See application file for complete search history.

(56) References Cited

U.S. PATENT DOCUMENTS

| | | |
|---|---|---|
| 2,266,200 A | 12/1941 | Hedley |
| 2,465,026 A | 3/1949 | Martz |
| 2,587,679 A | 3/1952 | Atkinson |
| 4,834,452 A | 5/1989 | Goodrich |
| 4,844,543 A | 7/1989 | Ochiai |
| 4,936,629 A | 6/1990 | Young |
| 5,183,312 A | 2/1993 | Nania |
| 5,292,179 A | 3/1994 | Forget |
| 5,468,046 A | 11/1995 | Weber et al. |
| 5,636,884 A | 6/1997 | Ladetto et al. |
| 5,651,576 A | 7/1997 | Wallace |
| 5,890,764 A | 4/1999 | Lee |
| 6,024,398 A | 2/2000 | Horton et al. |
| 6,106,066 A | 8/2000 | Moffa |
| 6,158,807 A | 12/2000 | Hampton |
| 6,196,629 B1 | 3/2001 | Onishi et al. |
| 6,241,314 B1 | 6/2001 | Pufall |
| 6,402,114 B1 | 6/2002 | Carnahan et al. |

(Continued)

FOREIGN PATENT DOCUMENTS

| | | |
|---|---|---|
| EP | 1772307 A2 | 4/2007 |
| GB | 2198937 A | 6/1988 |
| JP | 2001-328470 A | 11/2001 |

*Primary Examiner* — Anthony D Barfield
(74) *Attorney, Agent, or Firm* — G. Michael Roebuck (57) ABSTRACT

An apparatus is disclosed having a car seat base lower housing fixed in a center position on a car seat; a car seat base sliding rail mounted to the car seat base lower housing; a car seat base mechanism turntable bracket mounted on the car seat base sliding rail; a car seat base turn table rotationally mounted to the car seat base mechanism turn table bracket; a car seat neck mounted to the car seat base turntable; a car seat peg groove formed on the car seat base; and a car seat base peg formed on the car seat base turn table, wherein the car seat peg follows the car seat peg groove as the car seat base turn table bracket translates away from car seat base lower housing causing the car seat to rotate from a rearward facing position toward the direction of translation away from the center position.

13 Claims, 8 Drawing Sheets

(56) References Cited

U.S. PATENT DOCUMENTS

| | | |
|---|---|---|
| 6,505,887 B2 | 1/2003 | Hampton |
| 6,520,579 B2 | 2/2003 | Kassai et al. |
| 6,572,189 B1 | 6/2003 | Blaymore |
| 6,938,915 B2 | 9/2005 | Bischoff et al. |
| 6,938,954 B1 | 9/2005 | Hendren et al. |
| 6,981,746 B2 | 1/2006 | Chung et al. |
| 7,029,069 B2 | 4/2006 | Hendren et al. |
| 7,357,451 B2 | 4/2008 | Bendure et al. |
| 7,490,897 B2 | 2/2009 | Lhomme et al. |
| 7,614,692 B2 | 11/2009 | Biaud |
| 7,722,118 B2 | 5/2010 | Bapst et al. |
| 7,726,738 B1 | 6/2010 | Rice |
| 7,731,284 B2 | 6/2010 | Lhomme et al. |
| 7,753,444 B2 | 7/2010 | Vallentin |
| 7,810,682 B2 * | 10/2010 | Balensiefer et al. . 297/256.16 X |
| 2006/0170262 A1 | 8/2006 | Gold et al. |
| 2008/0211279 A1 | 9/2008 | Pesach |
| 2008/0290708 A1 | 11/2008 | Pos |
| 2009/0026819 A1 | 1/2009 | Zahar |

* cited by examiner

SLIDE-EXTENDED POSITION (exploded)

FIG. 7A (slide-extended position - passenger side)

SLIDE & SWIVEL MECHANISM

FIG. 7B (center position)

FIG. 7C (traveling position)

FIG. 7D (slide-extended position - driver's side)

SLIDE & SWIVEL SEQUENCE

INFANT CARRIER | STABILITY ARM

INFANT CARRIER | FLEXIBLE BRIM & HANDLES

EXPLODED VIEW (centered position)

FIG. 17

METHOD AND APPARATUS FOR AN INFANT SAFETY SEAT

CROSS REFERENCE TO RELATED PATENT APPLICATIONS

This patent claims priority from U.S. patent application 61/351,502 entitled A Method and Apparatus for an Infant Automobile Carriage System by Abadilla et al. filed on Jun. 4, 2010 and U.S. patent application 61/366,796 entitled A Method and Apparatus for an Infant Automobile Carriage System by Abadilla et al. filed on Aug. 2, 2010 both of which are hereby incorporated by reference in their entirety.

FIELD OF THE DISCLOSURE

The present invention relates to child safety seats, particularly an infant safety seat that is installed in an automobile.

BACKGROUND OF THE DISCLOSURE

Many conventional infant seats are heavy, unwieldy, cumbersome and relatively difficult to install in the back seat of a vehicle. In addition, many of the conventional safety seats pose difficulties during placement of the seats in the rear seat of a vehicle. The rear seat placement is recommended for infant safety. Thus there is a need for an improved infant seat that facilitates placement in the rear seat of a vehicle for operator convenience. Additionally, it is quiet easy for an operator to incur physical strain and associated frustration during installation and manual transportation of the safety seat.

According to experimental vehicular crash tests using dummies and monitored accelerometers mounted inside of crash test vehicle and actual real world statistics, it has been determined that an infant seat is at its utmost safest placement when positioned in the center position of the rear seat in conventional motor vehicles. Parents using current infant seats who favor convenience or who are physically challenged will place the infant seat adjacent a rear door, a statistically less safe location. With many conventional child safety seats it is a struggle between maximizing safety and maximizing ergonomics.

SUMMARY OF THE DISCLOSURE

An illustrative embodiment of an apparatus is disclosed including but not limited to a car seat base lower housing fixed in a center position on a car seat; a car seat base sliding rail mounted to the car seat base lower housing; a car seat base mechanism turntable bracket mounted on the car seat base sliding rail; a car seat base turn table rotationally mounted to the car seat base mechanism turn table bracket; a car seat neck mounted to the car seat base turntable; a car seat peg groove formed on the car seat base; and a car seat base peg formed on the car seat base turn table, wherein the car seat peg follows the car seat peg groove as the car seat base turn table bracket translates away from car seat base lower housing causing the car seat to rotate from a rearward facing position toward the direction of translation away from the center position.

In another illustrative embodiment, the apparatus further includes but is not limited to a car seat base rocker arm having a first foot at a first end and a second foot at a second end, wherein the car seat base rocker arm is pivotally mounted to the car seat base turntable bracket, wherein the first foot engages the car seat base during translation of the car seat base mechanism turntable in a first direction, thereby lowering the second foot to contact the car seat to provide support for the car seat base mechanism from underneath the car seat base in the first direction and wherein the second foot engages the car seat base during translation of the car seat base mechanism turntable in a second direction, thereby lowering the first foot to contact the car seat to provide support for the car seat base mechanism from underneath the car seat base in the second direction.

In another illustrative embodiment, the apparatus further includes but is not limited a car seat base articulating stability arm pivotally attached to a car seat outer shell for supporting the car seat outer shell while the car seat out shell is placed on a surface wherein a bottom of the car seat outer shell and the articulating stability arm contact the surface and support the car seat base outer shell in a stable position.

In another illustrative embodiment, an is disclosed that includes but is not limited to a car seat base lower housing fixed in a center position on a car seat; a car seat base translational transport mounted to the car seat base lower housing; a car seat base mechanism turntable bracket mounted on the car seat translational element; a car seat base turn table rotationally mounted to the car seat base mechanism turn table bracket; and a car seat base rotational element, wherein the car seat base rotational element rotates the car seat clockwise from a rearward facing position toward a first direction of translation of the car seat base lower housing on the translation transport away from the center position, as the car seat base turn table bracket translates away from the car seat base lower housing in the first direction of translation and the car seat base rotational element rotates the car seat clockwise from the rearward facing position toward a second direction of translation away from the center position, as the car seat base turn table bracket translates away from the car seat base lower housing in the second direction of translation.

In another illustrative embodiment, the apparatus further includes but is not limited to a groove formed in the car seat base lower housing and a peg formed in the bottom of the car seat base turn table, wherein the peg follows the groove during translational movement creating a rotational force that rotates the car seat base turntable. In another illustrative embodiment, the rotational element further comprises a rack and pinion that creates rotational force during translational movement that rotates the infant seat. In another illustrative embodiment, the rotational element further comprises rod linkage that creates rotational force during translational movement that rotates the infant seat. In another illustrative embodiment, the translational transport comprises a pair of telescopic arms that move in a first direction away from the centered, rearward facing position and in a second direction away from the centered, rearward facing position.

In another illustrative embodiment, the translational transport comprises at least one of a pair of telescopic ball bearing sliders and a pair of low friction plastic sliders. In another illustrative embodiment, the apparatus further includes but is not limited a center position locking mechanism for preventing translation and rotation of the safety seat. In another illustrative embodiment, the apparatus further includes but is not limited a car seat carrier flexible brim detachably connected to the car seat base lower housing for removing the flexible brim along with an infant supported by the flexible brim from the car seat base lower housing, wherein the flexible brim wraps around the infant for securing the infant during transport of the detached flexible brim.

In another illustrative embodiment, the apparatus further includes but is not limited the flexible brim further comprises a first handle and a second handle that separate and retractably engage a first and second side of the infant seat while supporting an infant in the infant seat and wherein the first and second handle come together to form a single handle for removing and transporting the infant in the flexible pod. In another illustrative embodiment, the apparatus further includes but is not limited the flexible brim further comprises a car seat base release apparatus for detachably connecting the flexible brim to the car seat base lower housing. In another illustrative embodiment, the apparatus further includes but is not limited a car seat base rocker arm having a first foot at a first end and a second foot at a second end, wherein the car seat base rocker arm is pivotally mounted to the car seat base turntable bracket, wherein the first foot engages the car seat base during translation of the car seat base mechanism turntable in a first direction, thereby lowering the second foot to contact the car seat to provide support for the car seat base mechanism from underneath the car seat base in the first direction and wherein the second foot engages the car seat base during translation of the car seat base mechanism turntable in a second direction, thereby lowering the first foot to contact the car seat to provide support for the car seat base mechanism from underneath the car seat base in the second direction. In another illustrative embodiment, the apparatus further includes but is not limited a car seat base articulating stability arm pivotally attached to a car seat outer shell for supporting the car seat outer shell while the car seat out shell is placed on a surface wherein a bottom of the car seat outer shell and the articulating stability arm contact the surface and support the car seat base outer shell in a stable position.

In another illustrative embodiment, a method is disclosed that includes but is not limited to placing a car seat base lower housing fixed in a center position on a car seat; automatically rotating a car seat turntable clockwise from a rearward facing position toward a first direction of translation of the car seat base lower housing on the translation transport away from the center position, as the car seat base turn table bracket translates away from the car seat base lower housing in the first direction of translation and the car seat base rotational element rotates the car seat clockwise from the rearward facing position toward a second direction of translation away from the center position, as the car seat base turn table bracket translates away from the car seat base lower housing in the second direction of translation.

In another illustrative embodiment, the method further includes but is not limited engaging a first foot of a rocker arm on the car seat base during translation of the car seat base mechanism turntable in a first direction, thereby lowering a second foot of the rocker arm to contact the car seat to provide support for the car seat base mechanism from underneath the car seat base in the first direction and wherein the second foot engages the car seat base during translation of the car seat base mechanism turntable in a second direction, thereby lowering the first foot to contact the car seat to provide support for the car seat base mechanism from underneath the car seat base in the second direction. In another illustrative embodiment, the method further includes but is not limited extending a car seat base articulating stability arm pivotally attached to a car seat outer shell for supporting the car seat outer shell while the car seat out shell is placed on a surface wherein a bottom of the car seat outer shell and the articulating stability arm contact the surface and support the car seat base outer shell in a stable position.

BRIEF DESCRIPTION OF THE DRAWINGS

FIG. 5B is a close up cutaway view showing the sliding mechanism and the rotating mechanism in their center position in a particular illustrative embodiment of the invention;

FIG. 7A-D B is a close up cutaway view showing the sliding mechanism and the rotating mechanism in their extended position, wherein the turntable's 302 angle is altered by turntable's peg 300 following the groove 105 that's built into the base;

FIGS. 15 and 16 depict a particular illustrative embodiment of the car seat having a carrier flexible brim (116) and handle (118) system.

DETAILED DESCRIPTION OF AN ILLUSTRATIVE EMBODIMENT

A child safety seat is disclosed that facilitates ease of ingress and egress, utilizing two movements to reposition the child closer to a vehicle exit. This safety seat system comprises of three main assemblies. The first assembly is a stationary lower base that attaches to the vehicle, usually by anchor straps or seat belt securing the base to the middle section of a rear bench seat. Attached to the base is a platform assembly that slides independently, laterally from the base, left to right, giving it the ability to be handled from either side of the vehicle. This sliding platform also contains a turntable, allowing the child seat assembly above it to rotate. These two movements together allow the placement of the child in the vehicle where it is safest.

A bidirectional dual action sliding and rotating child safety seat is disclosed. A particular illustrative embodiment substantially alleviates many deficiencies, discussed above that exist in many conventional vehicular child safety seats. An illustrative embodiment maintains a child in the middle of the rear seat of a vehicle during driving the vehicle and while still allowing easy access through a side door to the child and the seat by an operator. In an illustrative embodiment, the bidirectional, dual action sliding and rotating child safety seat is designed to provide the ability to easily slide the child safety seat to reposition the child safety seat from a rearward facing position in the middle of the back seat of a vehicle to a position on the back seat adjacent and facing either vehicle side door.

Typically, certain space limitations exist that prevent a rear facing child safety seat from simply being rotated and repositioned laterally. Many vehicles in use have limited interior space, especially in the rear seat, and repositioning a rear facing child safety seat can interfere with the vehicle's front seats. These space limitations are particularly problematic during ingress and egress of a child into an infant seat mounted in the rear seat of the vehicle. In a particular illustrative embodiment, the secondary action of automatic rotation of the rearward facing car seat during translation toward the direction of translation in either direction for both the left rear vehicle door and the right rear vehicle door substantially avoids interference with the vehicle's interior back seat and front seat fixtures. A particular illustrative embodiment also places the child in a more convenient position adjacent a side read door to facilitate removal of the child from the child safety seat and placement into the child into the child safety seat. A particular illustrative embodiment provides a child safety seat apparatus that provides safety and convenience by providing the ability to change seat locations and seat positions. Another particular illustrative embodiment provides a child safety seat that facilitates extraction of a sleeping child from the safety seat without disturbing the child with the use of a removable carrier with flexible handles. A particular illustrative embodiment provide a child safety seat that allows easy manual transportation with the use of unconventional construction, resulting in a significantly lighter weight portable assembly.

Further innovations that improve child safety seat function are a removable flexible pod to avoid disturbing a sleeping child, the material composition of the child safety seat, and the manual handling of the detached pod thanks to flexible thermoplastic co-polymer elastomer straps versus conventional bulky handles. These technologies tie in with the concept of easing ingress and egress, and adding ergonomic benefits for the parents or caretakers while improving child safety and comfort. The result is a convenient child transport system that is light weight, compatible with more passenger vehicles than conventional child car seats, and one that will not compromise between child safety and operator ergonomics.

In a particular illustrative embodiment of the present invention is installed on a vehicle's rear bench seat. The base is situated in the centermost position with the rear vehicle seat oriented in a rearward facing position relative to forward motion of the vehicle. The embodiment represented illustrates a position indicated as the statistically safest for a child in a moving vehicle. Aspects of the invention, such as the assemblie's fixation to the vehicle, conventions for operator usage, and obvious standards for a child's safety are recognized as being within the technical scope of individuals having average skill in the art.

Figure 1:
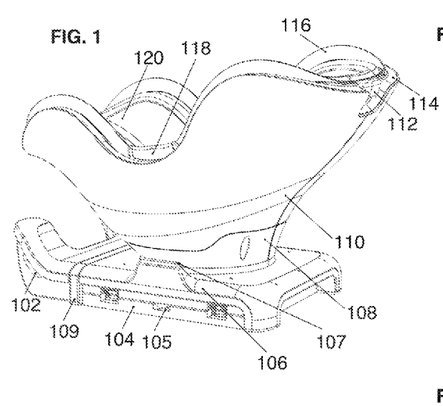
FIG. 1 depicts a perspective view of a particular illustrative embodiment of a child safety seat assembly, as seen from the front right quadrant, in a resting center position, which comprises of a bottom immovable base 104, a sliding platform 106 on top of a base, and a rotating seat 110 on top of a sliding platform.

Turning now to FIG. 1, FIG. 1 depicts multiple elements combining to form a particular embodiment of the bidirectional sliding and rotating child safety seat. In a particular illustrative embodiment the dual action infant car seat assembly comprises three sub assemblies a Lower Sub-Assembly comprised of a Base and Moving Platform, an Upper Sub-Assembly comprised of a Neck and Cradle and a Top Sub-Assembly comprised of a Carrier.

In a particular illustrative embodiment, the Lower Sub-Assembly comprises of Base and Moving Platform further include but are not limited to 102—Seat Belt Loop, 104—Car Seat Base_Lower Housing (stationary), 105—Car Seat Base_Peg Groove, 106—Car Seat Base_Upper Housing, 107—Car Seat Base_Slide Release Apparatus, 200—Car Seat Base_Sliding Rails, 201—Car Seat Base Mechanism_Turn Table Bracket, 202—Car Seat Base Mechanism_Turn Table Bracket Spacer, 300—Car Seat Base_Swiveling Peg, 302—Car Seat Base_Turn Table, 700—Car Seat Base_Guide Groove for Rocker Arm, 1702—Car Seat Base_Foot, and 1704—Car Seat Base_Bottom Frame.

The seat belt loop 102 secures the Car Seat Base_Lower Housing 104 of the infant safety seat to a center position in the rear bench seat of a car. The Car Seat Base_Upper Housing 106 translates upon Car Seat Base Sliding Rails 200 in opposite directions to the left and right of the center position formed by stationary Car Seat Base_Lower Housing. As the Car Seat Base_Upper Housing 106 translates to the left or right of the Car Seat Base_Lower Housing, the Car Seat Base_Swiveling Peg 302 follows Car Seat Base_Peg Groove 105 causing Car Seat Base_Turn Table 302 to rotate within Car Seat Base Mechanism_Turn Table Bracket 202 in the direction of translation and away from a rearward facing position. The Car Seat Base_Rocker Arm 109 follows Car Seat Base_Guide Groove for Rocker Arm 700 causing a first foot on a first distal end of the Car Seat Base_Rocker Arm to rise up following the Groove 700 and a second foot of a second distal end of Car Seat Base_Rocker Arm to dip down to contact the rear bench seat to provide additional support to the translating Car Seat Upper Housing 106 at it moves right or left of the center position. The first foot rises on the guide Groove 700 and the second foot contacts the rear bench seat when the Car Seat Upper Housing 106 translates in a first direction away from the stationary Car. Seat Base Lower Housing (i.e., moving left of center) and the second foot rises on the Groove 700 and the first foot contacts the rear car bench seat when the Car Seat Upper Housing translates in a second direction away from the stationary Car Seat Base Lower Housing (i.e., moving right of center).

In another particular embodiment the Upper Sub-Assembly further includes but is not limited to a Neck and Cradle which further includes but is not limited to a 108—Car Seat Base_Cradle Neck, 109—Car Seat Base_Rocker Arm, 110—Car Seat Base_Outer Cradle Shell and 114—Car Seat Cradle_Impact Foam. The Car Seat Base_Cradle Neck 108 supports Car Seat Base_Outer Cradle Shell 110. The Car Seat Cradle_Impact Foam is layered over the Car Seat Base_Outer Cradle Shell 110.

In another particular embodiment, the Top Sub-Assembly comprises of Carrier further includes but is not limited to 112—Car Seat Carrier_Release Apparatus, 116—Car Seat Carrier_Flexible Brim, 118—Car Sear Carrier_Carry Handles, 120—Car Seat Carrier_Upholstery, 400—Car Seat Carrier_Outer Shell, 1300—Car Seat Carrier_Articulating Stability Arm, 1302—Car Seat Carrier_Locking Apparatus and 1700—Car Seat Carrier_Inner Shell. The Car Seat Carrier Flexible Brim is attached to the Car Seat Base_Outer Cradle Shell by Car Seat Carrier Release Apparatus 112. The Car Seat Carrier_Flexible Brim 116 provides Car Seat Carrier_Carry Handles 118. The Handles 118 enable lifting of an infant lying in the flexible brim 116 to be lifted and separated from the Car Seat Base_Outer Cradle Shell 110. The flexible brim 116 flexes under the weight of the infant allowing handles 118 to move toward each other and join above the infant for hand carrying the flexible brim enveloping the infant.

In a particular embodiment, the base is installed onto the center position of an automobile rear bench seat and affixed in place utilizing LATCH and/or the vehicle's factory safety belt system through the safety belt hoops. Default orientation of the cradle will have the infant facing the rear of the vehicle. The platform sits on top of the base in a resting position as depicted in FIG. 1. The platform may be attached to the base using ball-bearing sliders, providing low friction side-to-side lateral movement. Telescopic ball-bearing sliders may provide for an extended reach. This motion, mirrored on the dual action infant car seat's opposite side, describes the first action.

The second action is rotational and is performed automatically by the upper assembly during sliding of the platform to one side or another, consisting of but not limited to the neck and the cradle. In a particular illustrative embodiment, this motion may be controlled by the base containing groove. Resting position orients a rear facing cradle. Extended position will orient a side facing cradle. This rotational movement may be actuated by a peg and turn table following the groove in the base. In another embodiment, the groove ramp angles and peg location are customizable to alter the rotation of the seat during translational movement. The base and platform's dual action translation and rotation movement may be achieved in different ways. The first described method is the peg in groove to effectuate rotation of the turntable during translation of the car seat base in either direction away from center. In another embodiment, the peg and groove are fashioned so that the car seat base rotates 180 degrees to a forward facing position during translational movement toward a position adjacent a side door. The degree of rotation during translation is determined by the adjustment of the peg location and/or the angle of the groove in the base.

In alternative embodiments, the apparatus and method for facilitating turntable rotation include but are not limited to a rack and pinion and rod linkage. In another embodiment, the moving platform attaches to the seat base with two bi-directional full extension ball-bearing slides to minimize friction, but low friction plastics can also be used. A central locking spring actuated mechanism may be employed to prevent platform movement and turntable rotation. Spring loaded triggers on the platform may provide for the most intuitive method for unlocking the system.

Figure 2:
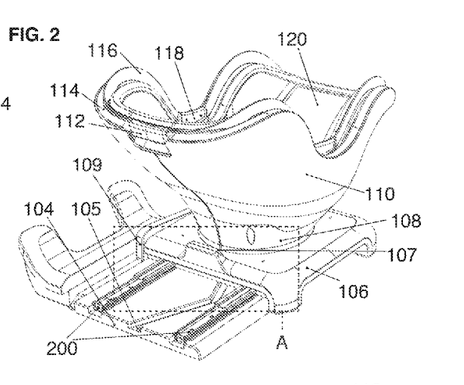
FIG. 2 depicts a perspective view of a particular illustrative embodiment of a child safety seat assembly, with the platform and accompanying seat extended to its leftmost position.

Turning now to FIG. 2, FIG. 2 depicts a perspective view of a particular illustrative embodiment of a child safety seat assembly, with the platform and accompanying seat extended to its leftmost position. FIG. 2 detail A depicts a cutaway view of FIG. 2 displaying mechanisms which may facilitate the base's translational side movement away from a center position and the seat's rotation movement during translation, comprising bidirectional telescopic ball bearing sliders 200 and a turntable 302 whose rotational angle is defined by the base's groove 105 guiding the turntable's peg 300.

Figures 3, 3A:
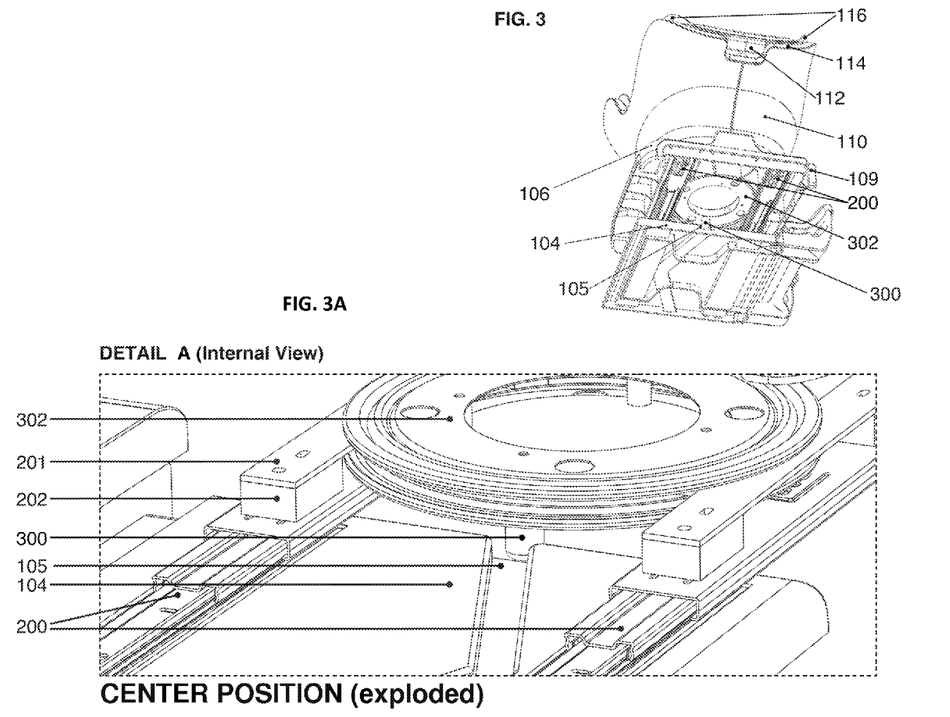
FIG. 3 is a perspective view of an underside of a particular illustrative embodiment of the child safety seat assembly, with the seat and accompanying platform extended to a leftmost position illustrated in FIG. 2.
FIG. 3A depicts a cutaway view of FIG. 3 displaying mechanisms which may facilitate the base's slide movement and the seat's rotation movement, comprising bidirectional telescopic ball bearing sliders 200 and a turntable 302 whose rotational angle is defined by the base's groove 105 guiding the turntable's peg 300.

Turning now to FIG. 3, FIG. 3 is a perspective view of an underside of a particular illustrative embodiment of the child safety seat assembly, with the seat and accompanying platform extended to a leftmost position illustrated in FIG. 2.

Figure 4:
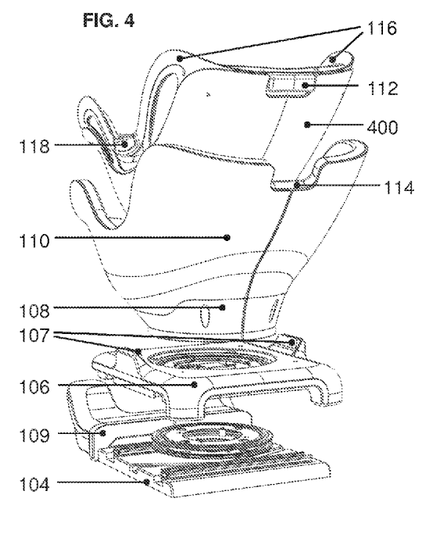
FIG. 4 is a frontal exploded view of a particular illustrative embodiment of the child safety seat assembly, separating the base, the sliding platform, and the rotating seat.

Turning now to FIG. 4, FIG. 4 is a frontal exploded view of a particular illustrative embodiment of the child safety seat assembly, separating the base, the sliding platform, and the rotating seat the child safety seat assembly, separating the base, the sliding platform, and the rotating seat.

Figure 5:
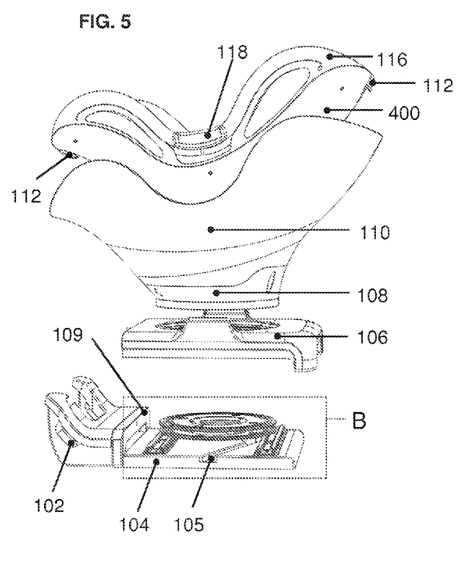
FIG. 5 is a left side exploded view of a particular illustrative embodiment of the child safety seat assembly, as illustrated in FIG. 4, showing the child safety seat assembly, separating the base, the sliding platform, and the rotating seat.

Turning now to FIG. 5, FIG. 5 is a left side exploded view of a particular illustrative embodiment of the child safety seat assembly, as illustrated in FIG. 4, showing the child safety seat assembly, separating the base, the sliding platform, and the rotating seat.

FIG. 5 detail A is a close up cutaway view showing the sliding mechanism and the rotating mechanism in their center position in a particular illustrative embodiment of the invention.

Figure 6:
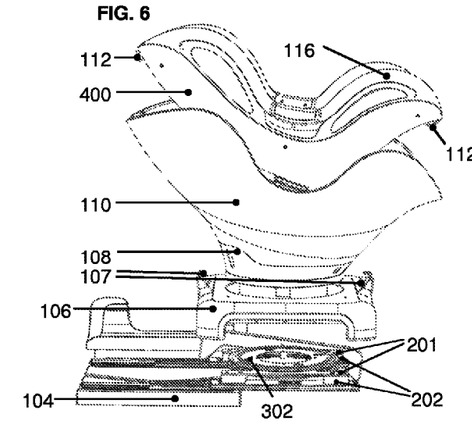
FIG. 6 is an exploded view illustrating a particular illustrative embodiment of the child safety seat's extended position toward the passenger side of a vehicle, as seen from the assembly's front.

Turning now to FIG. 6, FIG. 6 is an exploded view illustrating a particular illustrative embodiment of the child safety seat's extended position, as seen from the assembly's front.

Figure 7:
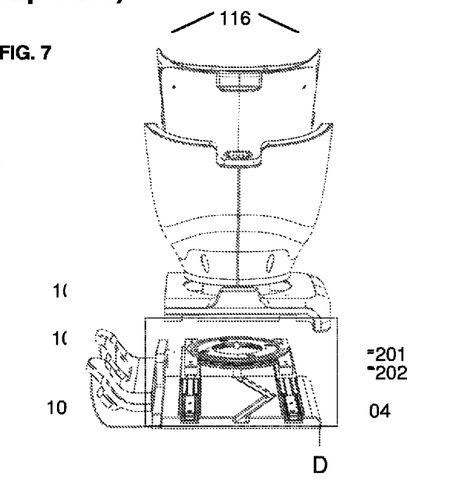
FIG. 7 is an exploded view of a particular illustrative embodiment in the extended position as shown in FIG. 6, as seen from a left side of the assembly.
Figure 7A:
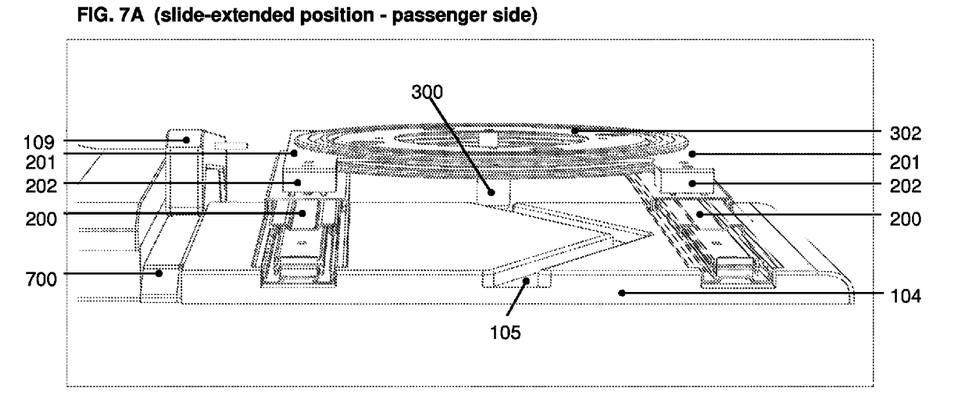
Figure 7B:
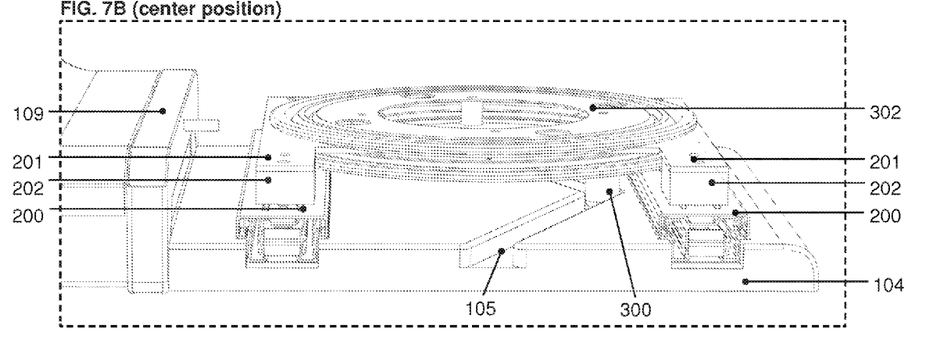
Figure 7C:
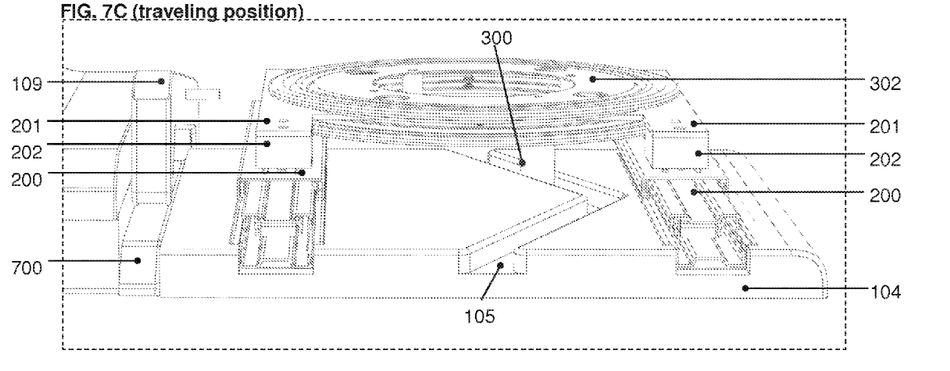
Figure 7D:
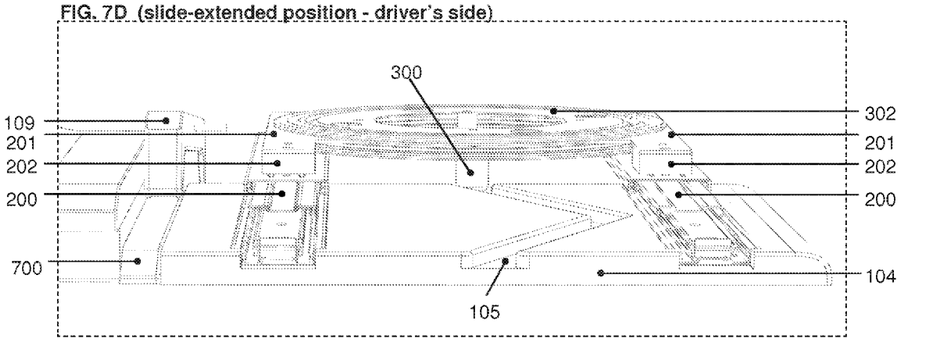

Turning now to FIG. 7, FIG. 7 is an exploded view of a particular illustrative embodiment in the extended position as shown in FIG. 6, as seen from a left side of the assembly.

Turning now to FIG. 7, FIG. 7 detail B is a close up cutaway view showing the sliding mechanism and the rotating mechanism in their extended position, wherein the turntable's 302 angle is altered by turntable's peg 300 following the groove 105 that's built into the base.

Figure 8:
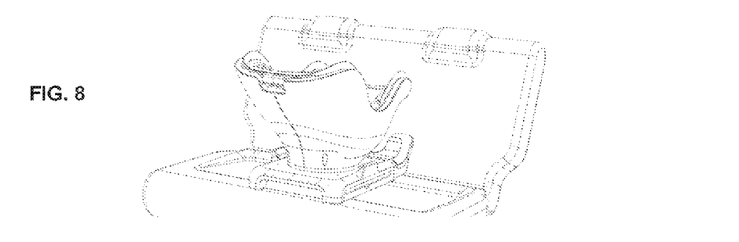
FIGS. 8 though 11 illustrate the movement of a particular illustrative embodiment of the sliding platform from center to a left extended position in one quarter moment increments, wherein as the platform slides and the seat rotates, however alternative embodiments do not bind both movements exclusively.
Figure 9:
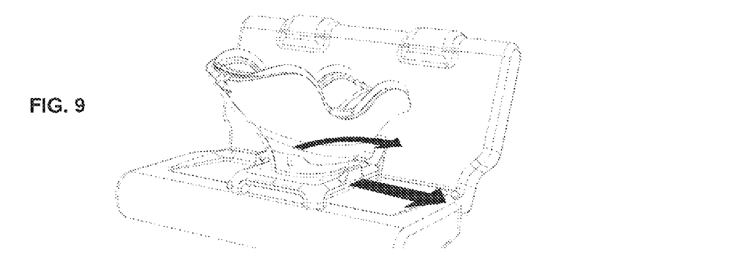
Figure 10:
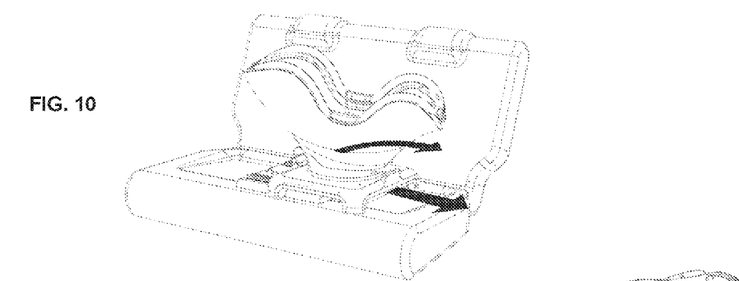
Figure 11:
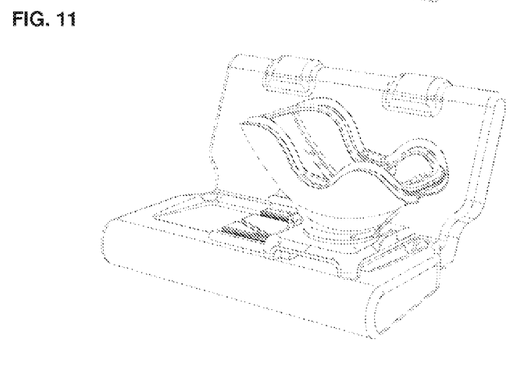

FIGS. 8 though 11 illustrate the movement of a particular illustrative embodiment of the sliding platform from center to a left extended position in one quarter moment increments, wherein as the platform slides and the seat rotates, however alternative embodiments do not bind both movements exclusively.

Figure 12:
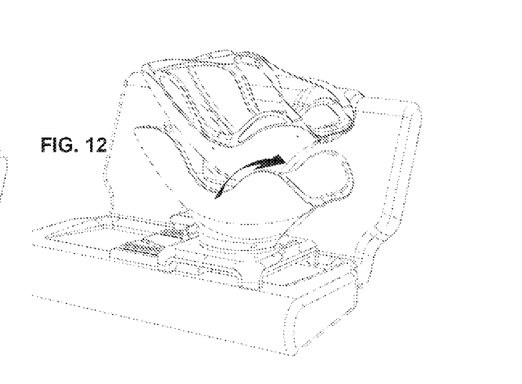
FIG. 12 depicts the removal of a particular illustrative embodiment of the car seat carrier from the car seat base cradle in a particular illustrative embodiment.

Turning now to FIG. 12, FIG. 12 depicts the removal of a particular illustrative embodiment of the car seat carrier from the car seat base cradle in a particular illustrative embodiment.

Figure 13:
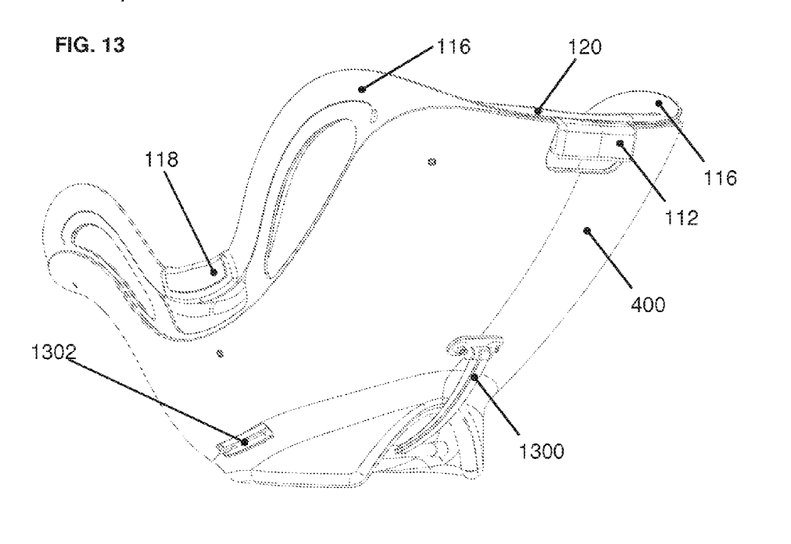
FIGS. 13 and 14 depict a particular illustrative embodiment of the car seat carrier articulating stability arm (1300). This arm allows a larger footprint for enhanced stability when the car seat carrier is placed on the ground.
Figure 14:
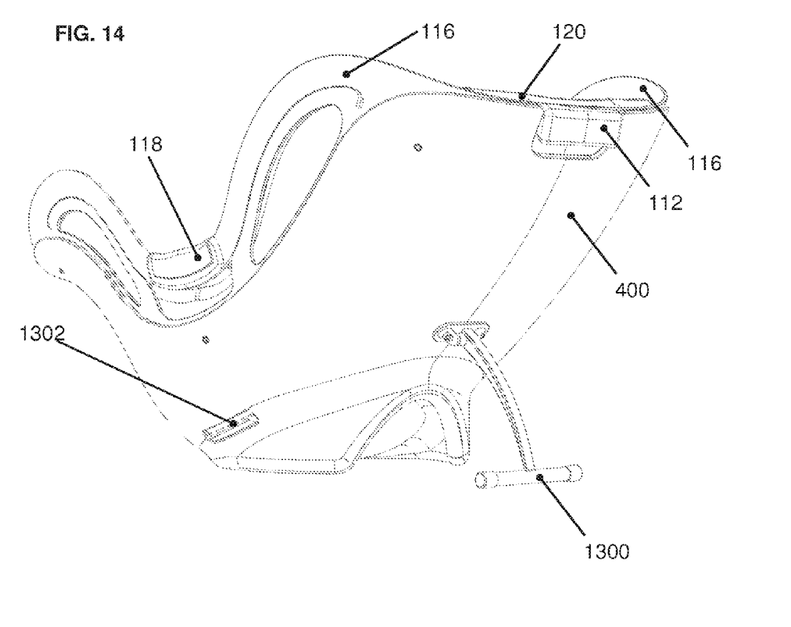

Turning now to FIGS. 13 and 14, FIGS. 13 and 14 depict a particular illustrative embodiment of the car seat carrier articulating stability arm 1300. This arm allows a larger footprint for enhanced stability when the car seat carrier is placed on the ground.

Figure 15:
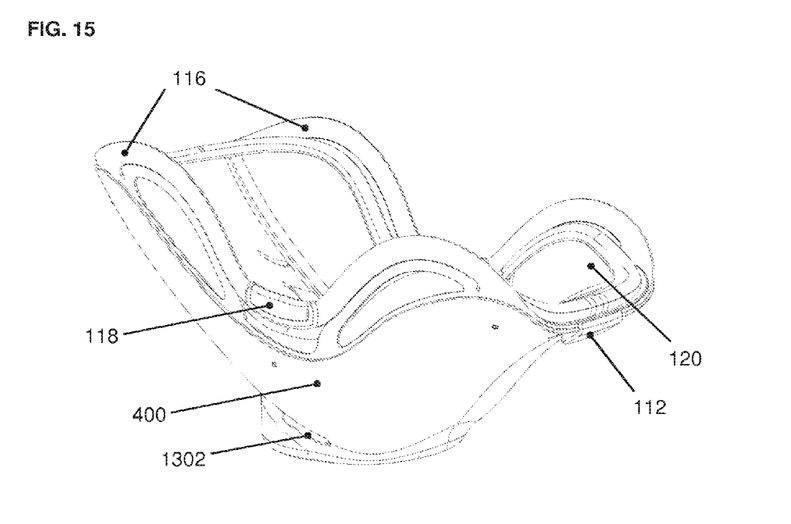
FIG. 15 shows the flexible brim (116) and handles (118) in a resting position.
Figure 16:
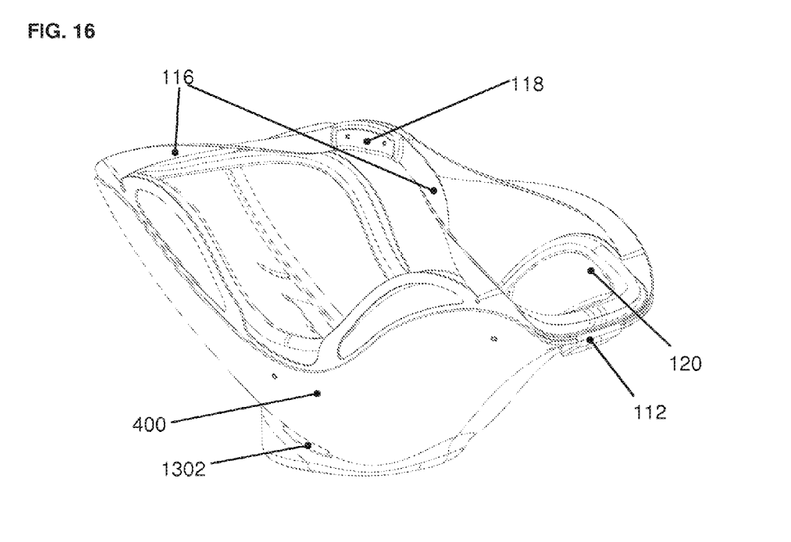
FIG. 16 shows the flexible brim (116) and handles (118) in a raised position for manual hand carrying.

Turning now to FIGS. 15 and 16, FIGS. 15 and 16 depict a particular illustrative embodiment of the car seat having a carrier flexible brim 116 and handle 118 system. FIG. 15 shows the flexible brim 116 and handles 118 in a resting position. FIG. 16 shows the flexible brim 116 and handles 118 in a raised position for manual hand carrying.

Figure 17:
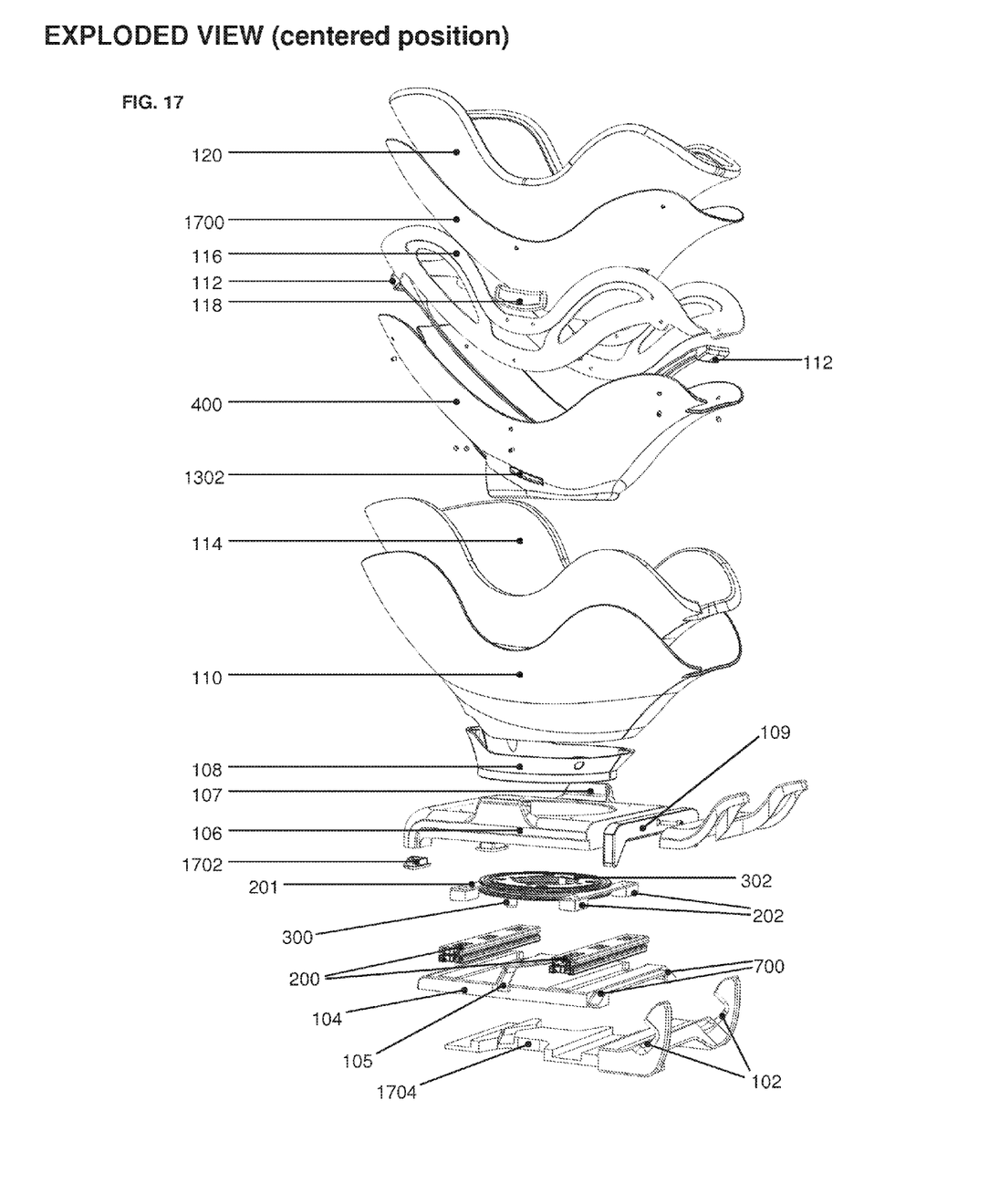
FIG. 17 depicts an exploded view of a particular illustrative embodiment.

Turning now to FIG. 17, FIG. 17 depicts an exploded view of a particular illustrative embodiment.

The foregoing examples of illustrative embodiments are for purposes of example only and are not intended to limit the scope of the invention.

What is claimed is:

1. An apparatus comprising:
   a car seat base lower housing fixed in a center position on a car seat;
   a car seat base sliding rail mounted to the car seat base lower housing;
   a car seat base mechanism turntable bracket mounted on the car seat base sliding rail;
   a car seat base turn table rotationally mounted to the car seat base mechanism turn table bracket;

a car seat neck mounted to the car seat base turntable;

a car seat peg groove formed on the car seat base;

a car seat base peg formed on the car seat base turn table, wherein the car seat peg follows the car seat peg groove as the car seat base turn table bracket translates away from car seat base lower housing causing the car seat to rotate from a rearward facing position toward the direction of translation away from the center position; and a car seat base rocker arm having a first foot at a first end and a second foot at a second end, wherein the car seat base rocker arm is pivotally mounted to the car seat base turntable bracket, wherein the first foot engages the car seat base during translation of the car seat base mechanism turntable in a first direction, thereby lowering the second foot to contact the car seat to provide support for the car seat base mechanism from underneath the car seat base in the first direction and wherein the second foot engages the car seat base during translation of the car seat base mechanism turntable in a second direction, thereby lowering the first foot to contact the car seat to provide support for the car seat base mechanism from underneath the car seat base in the second direction.

2. The apparatus of claim 1 further comprising:

a car seat base articulating stability arm pivotally attached to a car seat outer shell for supporting the car seat outer shell while the car seat out shell is placed on a surface wherein a bottom of the car seat outer shell and the articulating stability arm contact the surface and support the car seat base outer shell in a stable position.

3. An apparatus comprising:

a car seat base lower housing fixed in a center position on a car seat;

a car seat base translational transport mounted to the car seat base lower housing;

a car seat base mechanism turntable bracket mounted on the car seat translational element;

a car seat base turn table rotationally mounted to the car seat base mechanism turn table bracket; and a car seat base rotational element, wherein the car seat base rotational element rotates the car seat clockwise from a rearward facing position toward a first direction of translation of the car seat base lower housing on the translation transport away from the center position, as the car seat base turn table bracket translates away from the car seat base lower housing in the first direction of translation and the car seat base rotational element rotates the car seat clockwise from the rearward facing position toward a second direction of translation away from the center position, as the car seat base turn table bracket translates away from the car seat base lower housing in the second direction of translation; and a car seat carrier flexible brim detachably connected to the car seat base lower housing for removing the flexible brim along with an infant supported by the flexible brim from the car seat base lower housing, wherein the flexible brim wraps around the infant for securing the infant during transport of the detached flexible brim, wherein the flexible brim further comprises a first handle and a second handle that separate and retractably engage a first and second side of the infant seat while supporting an infant in the infant seat and wherein the first and second handle come together to form a single handle for removing and transporting the infant in the flexible pod.

4. The apparatus of claim 3, wherein the rotational element further comprises a groove formed in the car seat base lower housing and a peg formed in the bottom of the car seat base turn table, wherein the peg follows the groove during translational movement creating a rotational force that rotates the car seat base turntable.

5. The apparatus of claim 3, wherein the rotational element further comprises a rack and pinion that creates rotational force during translational movement that rotates the infant seat.

6. The apparatus of claim 3 wherein the translational transport comprises a pair of telescopic arms that move in a first direction away from the centered, rearward facing position and in a second direction away from the centered, rearward facing position.

7. The apparatus of claim 3, wherein the translational transport comprises at least one of a pair of telescopic ball bearing sliders and a pair of low friction plastic sliders.

8. The apparatus of claim 3, the apparatus further comprising a center position locking mechanism for preventing translation and rotation of the safety seat.

9. The apparatus of claim 3, wherein the flexible brim further comprises a car seat base release apparatus for detachably connecting the flexible brim to the car seat base lower housing.

10. The apparatus of claim 3, further comprising:

a car seat base rocker arm having a first foot at a first end and a second foot at a second end, wherein the car seat base rocker arm is pivotally mounted to the car seat base turntable bracket, wherein the first foot engages the car seat base during translation of the car seat base mechanism turntable in a first direction, thereby lowering the second foot to contact the car seat to provide support for the car seat base mechanism from underneath the car seat base in the first direction and wherein the second foot engages the car seat base during translation of the car seat base mechanism turntable in a second direction, thereby lowering the first foot to contact the car seat to provide support for the car seat base mechanism from underneath the car seat base in the second direction.

11. The apparatus of claim 3, further comprising:

a car seat base articulating stability arm pivotally attached to a car seat outer shell for supporting the car seat outer shell while the car seat out shell is placed on a surface wherein a bottom of the car seat outer shell and the articulating stability arm contact the surface and support the car seat base outer shell in a stable position.

12. A method comprising:

placing a car seat base lower housing fixed in a center position on a car seat;

automatically rotating a car seat turntable clockwise from a rearward facing position toward a first direction of translation of the car seat base lower housing on the translation transport away from the center position, as the car seat base turn table bracket translates away from the car seat base lower housing in the first direction of translation and the car seat base rotational element rotates the car seat clockwise from the rearward facing position toward a second direction of translation away from the center position, as the car seat base turn table bracket translates away from the car seat base lower housing in the second direction of translation; and engaging a first foot of a rocker arm on the car seat base during translation of the car seat base mechanism turntable in a first direction, thereby lowering a second foot of the rocker arm to contact the car seat to provide support for the car seat base mechanism from underneath the car seat base in the first direction and wherein the second foot engages the car seat base during translation of the car seat base mechanism turntable in a second direction, thereby lowering the first foot to contact the car seat to provide support for the car seat base mechanism from underneath the car seat base in the second direction.

13. The method of claim 12, the method further comprising:

extending a car seat base articulating stability arm pivotally attached to a car seat outer shell for supporting the car seat outer shell while the car seat out shell is placed on a surface wherein a bottom of the car seat outer shell and the articulating stability arm contact the surface and support the car seat base outer shell in a stable position.

* * * * *